(12) United States Patent
Wochnick

(10) Patent No.: US 7,152,832 B2
(45) Date of Patent: *Dec. 26, 2006

(54) PIPE SUPPORT APPARATUS

(76) Inventor: Patrick A. Wochnick, 6019 SE. 23rd Ave., Portland, OR (US) 97202

( * ) Notice: Subject to any disclaimer, the term of this patent is extended or adjusted under 35 U.S.C. 154(b) by 133 days.

This patent is subject to a terminal disclaimer.

(21) Appl. No.: 10/763,468

(22) Filed: Jan. 22, 2004

(65) Prior Publication Data
US 2005/0017133 A1 Jan. 27, 2005

Related U.S. Application Data

(63) Continuation-in-part of application No. 10/195,091, filed on Jul. 11, 2002, now Pat. No. 6,685,144, which is a continuation-in-part of application No. 09/840,729, filed on Apr. 23, 2001, now abandoned.

(51) Int. Cl.
F16L 3/08 (2006.01)

(52) U.S. Cl. ..................................... 248/74.3

(58) Field of Classification Search ............... 248/49, 248/58, 62, 65, 71, 74.3; 24/68 R, 70 ST, 24/69 ST, 71 ST; 285/61
See application file for complete search history.

(56) References Cited

U.S. PATENT DOCUMENTS

| 485,033 | A | * | 10/1892 | Hanna ..................... 248/60 |
|---|---|---|---|---|
| 624,484 | A | | 5/1899 | Haskell |
| 981,470 | A | | 1/1911 | Postel |
| 1,837,930 | A | | 12/1931 | Waite |
| 2,539,873 | A | | 1/1951 | Kirk |
| 3,149,808 | A | | 9/1964 | Weckesser |
| 3,330,517 | A | | 7/1967 | Zimmerman |
| 4,429,497 | A | | 2/1984 | Dibernardi |
| 4,555,083 | A | | 11/1985 | Carter |
| 4,653,716 | A | | 3/1987 | Sakaguchi |
| 4,735,387 | A | | 4/1988 | Hirano et al. |
| 4,767,087 | A | * | 8/1988 | Combu ..................... 248/62 |
| 5,040,751 | A | | 8/1991 | Holub |
| 5,112,013 | A | | 5/1992 | Tolbert et al. |
| 5,135,188 | A | | 8/1992 | Anderson et al. |
| 5,295,647 | A | * | 3/1994 | Weidler ..................... 248/62 |
| 5,746,401 | A | | 5/1998 | Condon |
| 5,876,000 | A | | 3/1999 | Ismert |
| 6,105,908 | A | | 8/2000 | Kraus |
| 6,126,122 | A | | 10/2000 | Ismert |
| 6,186,451 | B1 | | 2/2001 | Benoit |

OTHER PUBLICATIONS

Product information printout from website of LSP Products Group, Inc.

(Continued)

Primary Examiner—A. Joseph Wujciak
(74) Attorney, Agent, or Firm—Klarquist Sparkman, LLP

(57) ABSTRACT

Apparatus for supporting a pipe including a base member having a pipe encircling support attached thereto. In one embodiment, an elongate flexible strap having opposed first and second ends is secured to the base member. The strap has ratchet teeth formed along one side thereof and latching mechanism on the strap adjacent one end through which the other end and a portion of the strap may move longitudinally. The latching mechanism includes a pawl yieldably biased toward the path of the strap to engage the ratchet teeth permitting movement of the strap in one direction and inhibiting movement in the opposite direction. The apparatus may include a supplementary connector adapted to be secured to a support structure, the supplementary connector having an opening formed therein adapted to receive and hold the base member therein.

12 Claims, 8 Drawing Sheets

OTHER PUBLICATIONS

Catalog 2001, p. 18, Sioux Chief Manufacturing Company, Inc., Peculiar, Missouri.

Product Information, p. 6, Catalog Dec. 1999, LSP, Carson City, Nevada.

* cited by examiner

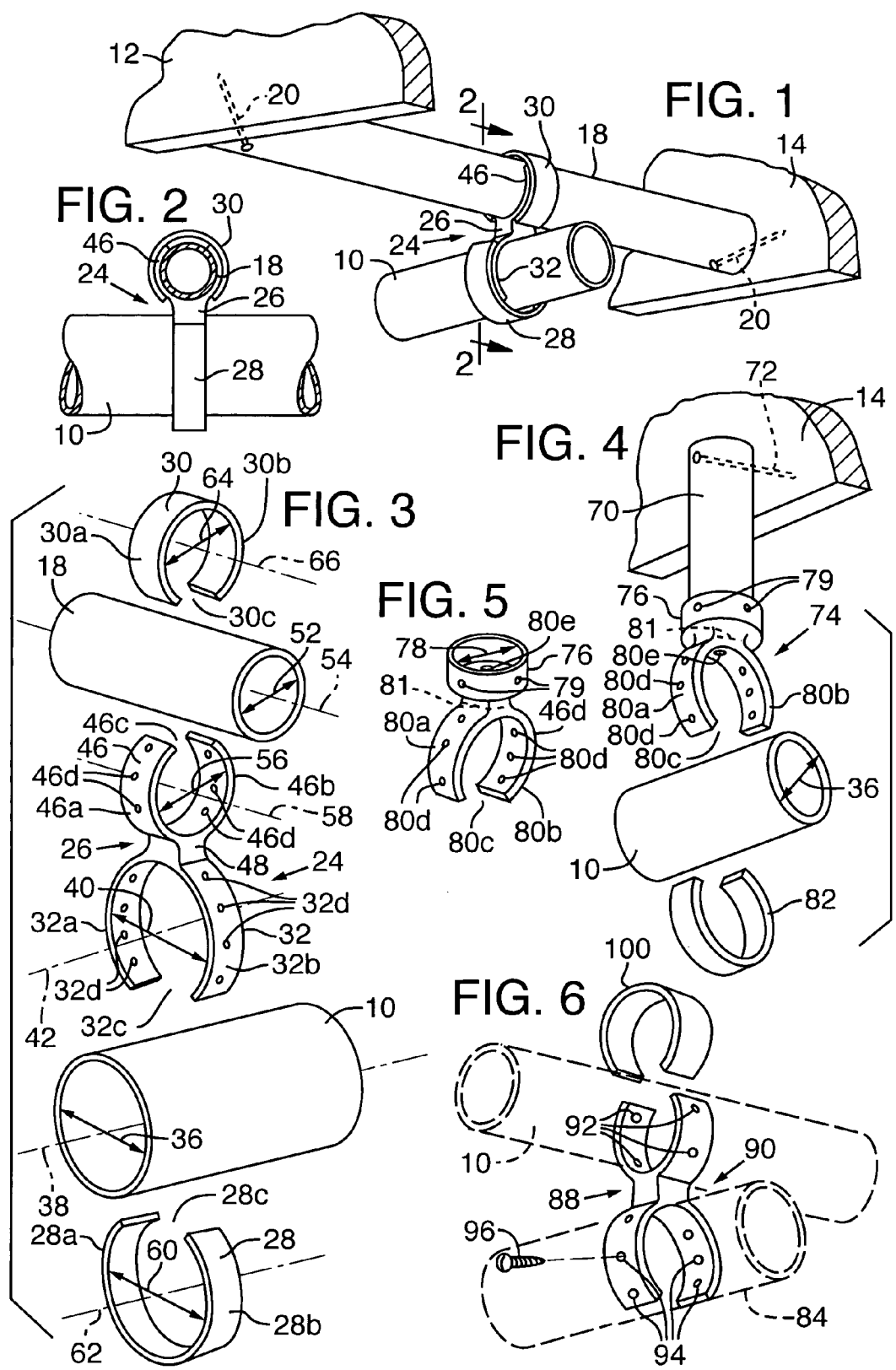

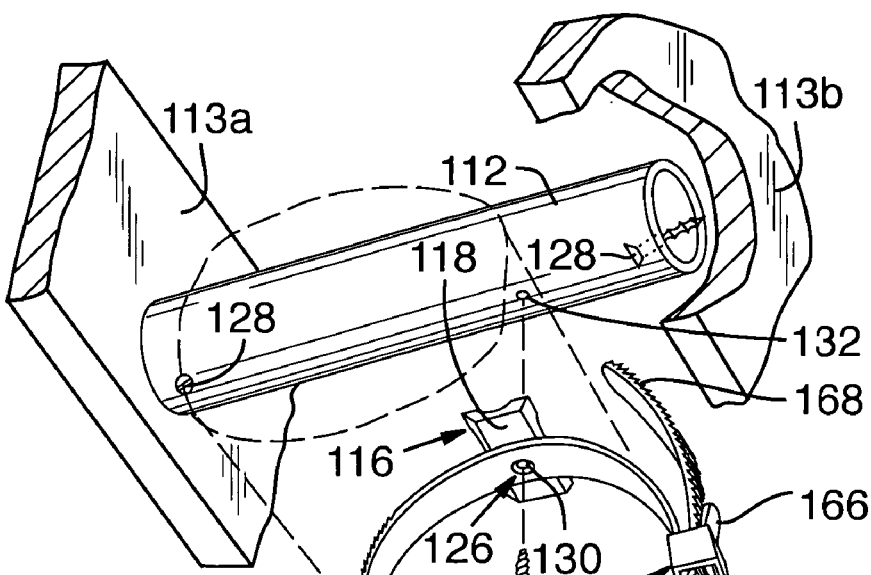
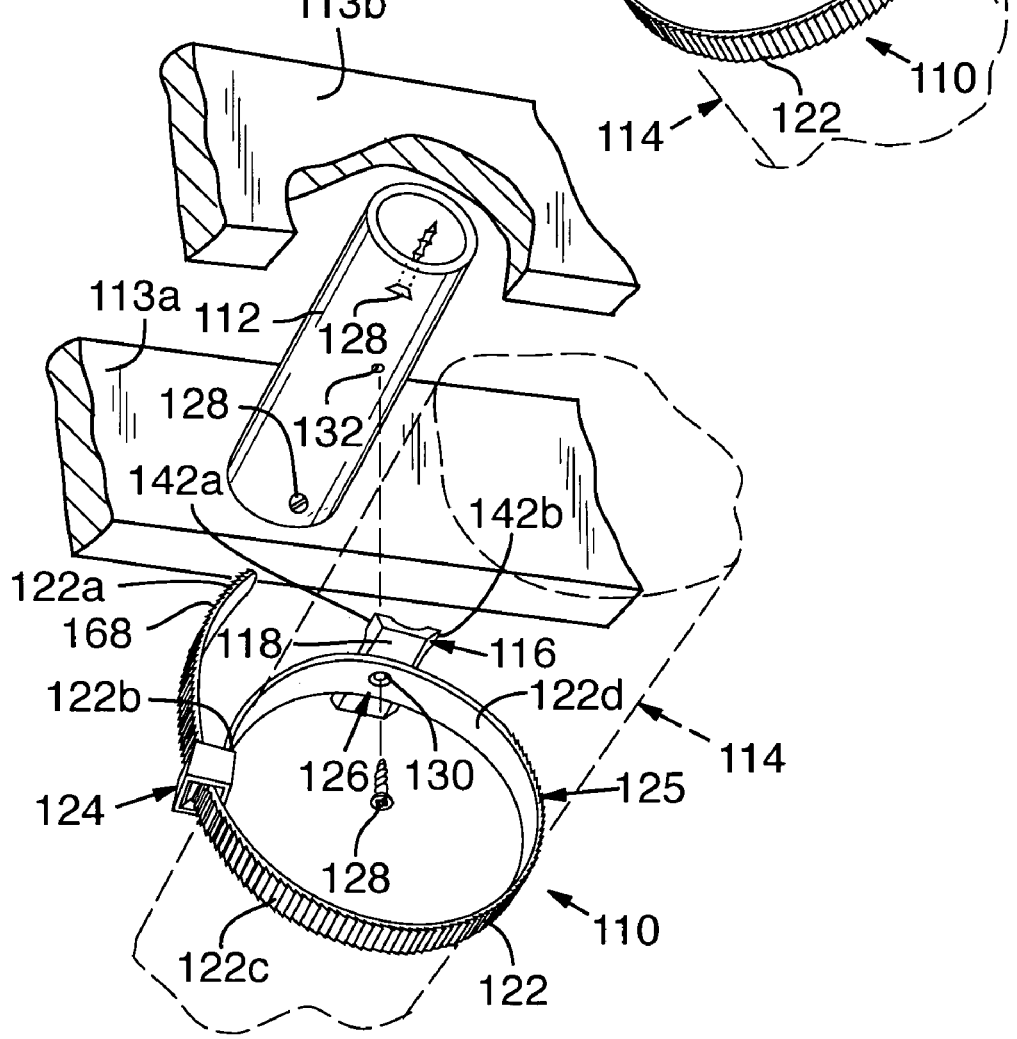

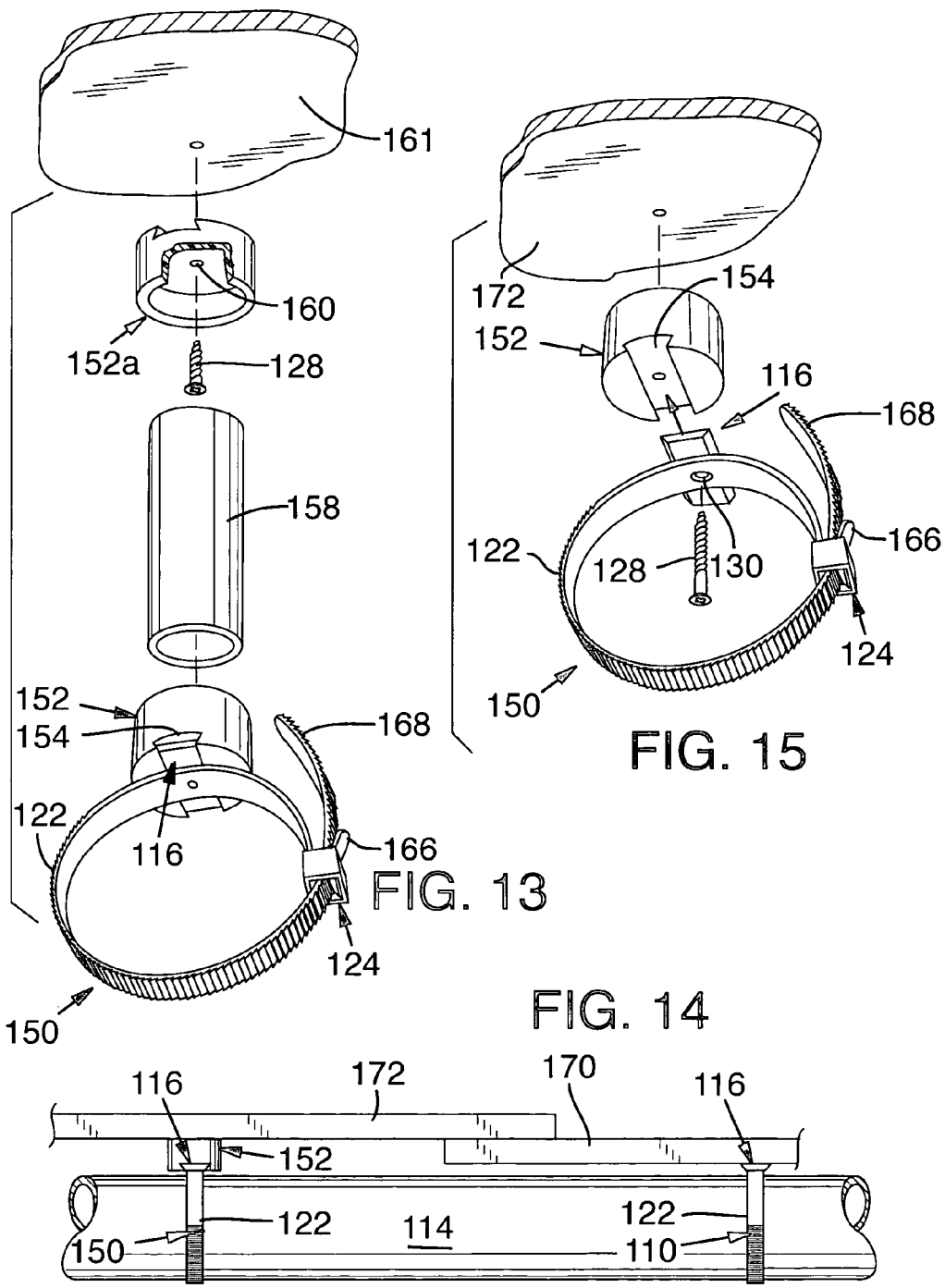

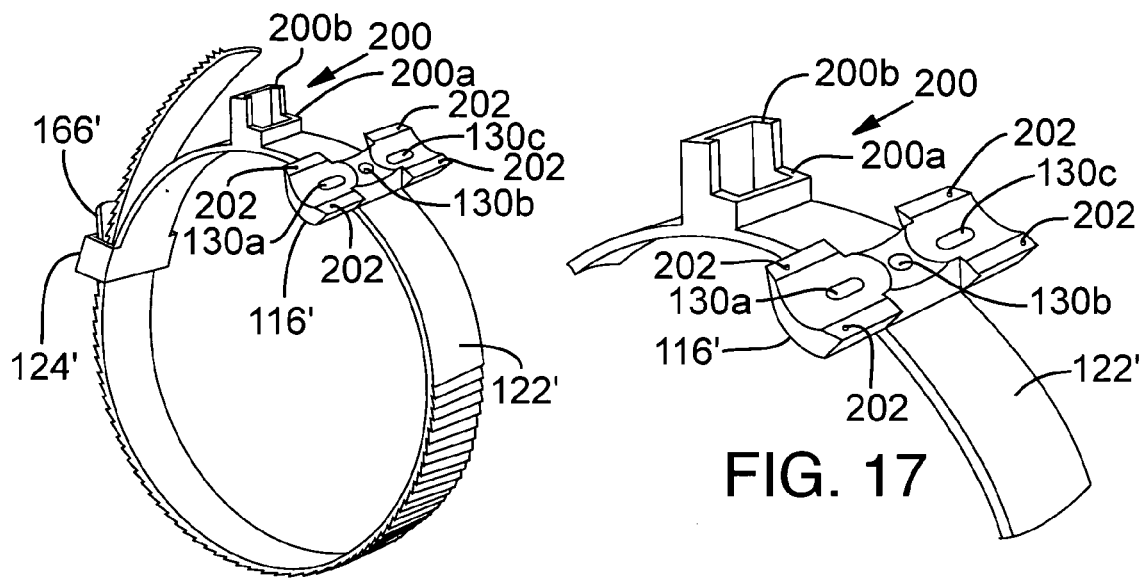
FIG. 16
FIG. 17
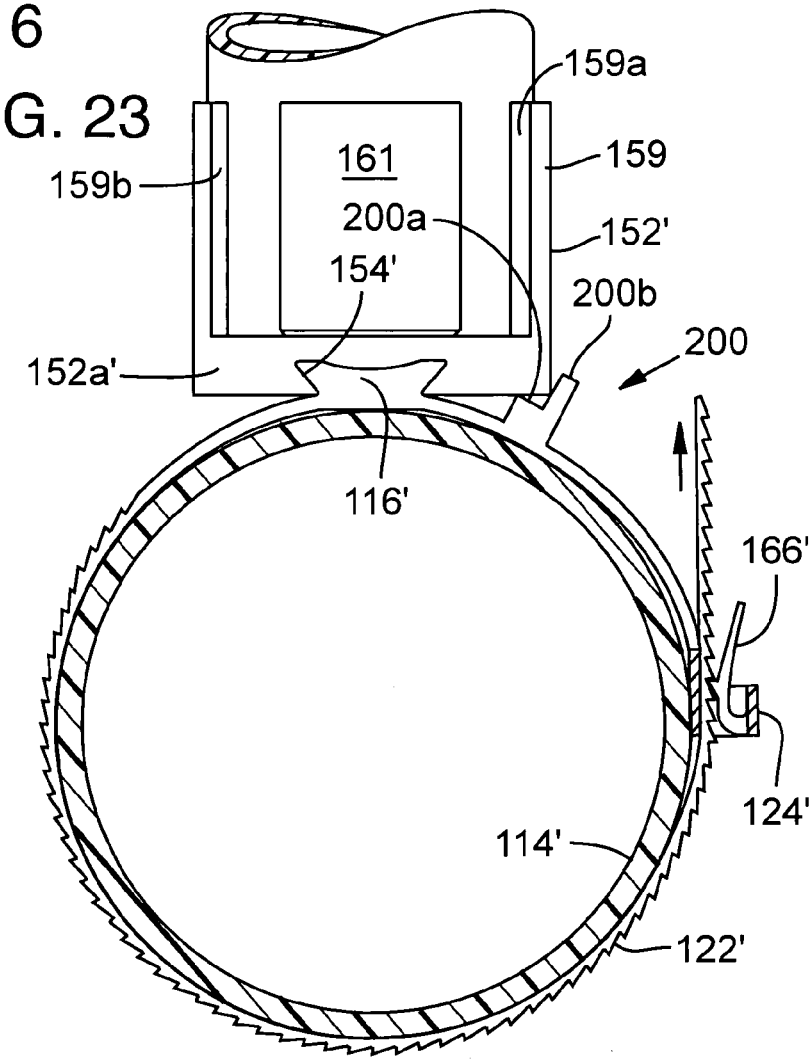
FIG. 23

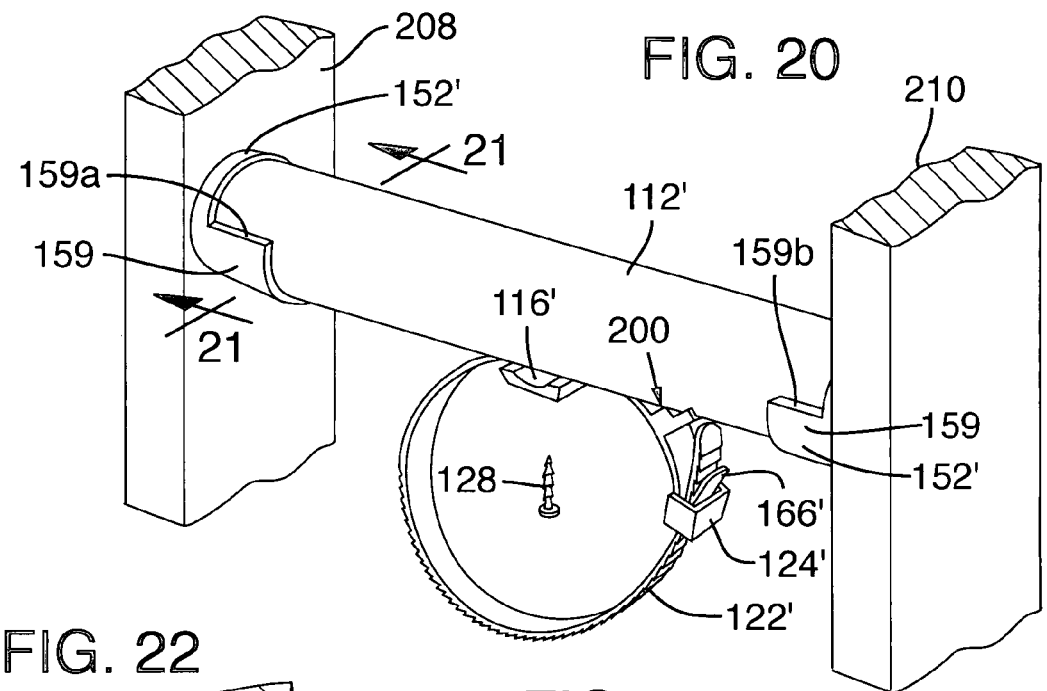
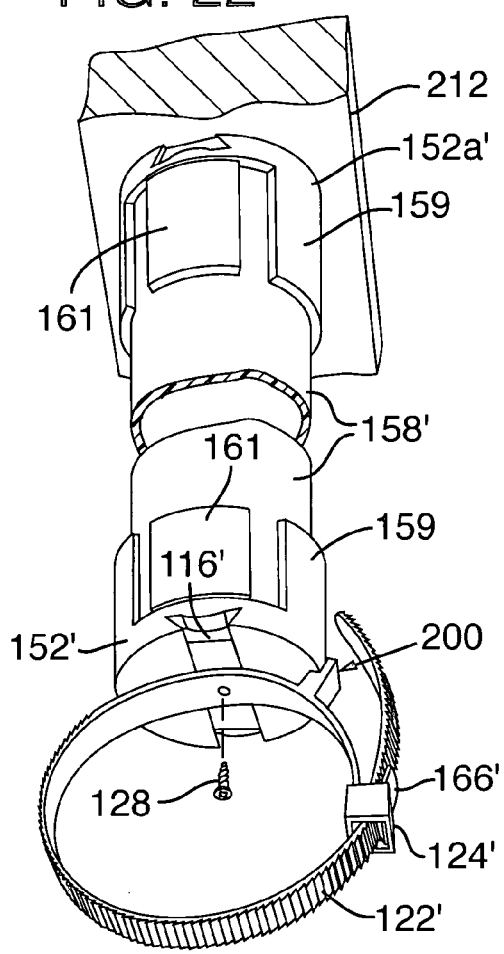
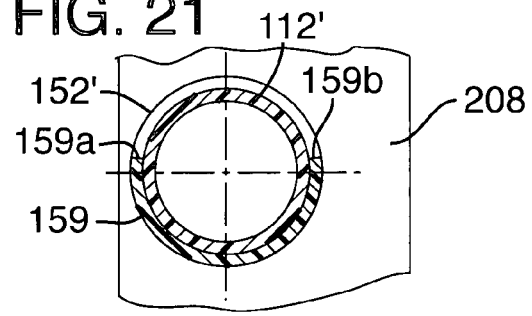
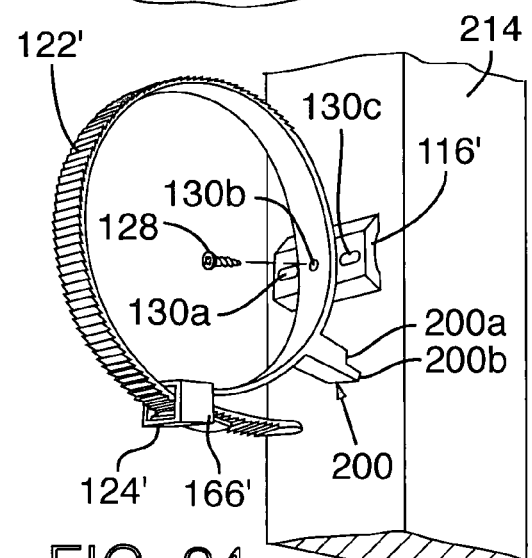

PIPE SUPPORT APPARATUS

This is a continuation-in-part of prior application U.S. Ser. No. 10/195,091 filed Jul. 11, 2002, now U.S. Pat. No. 6,685,144, which was a continuation-in-part of prior application U.S. Ser. No. 09/840,729 filed Apr. 23, 2001 now abandoned, both entitled Pipe Support Apparatus. Applicant claims the benefit of the earlier filing dates of the prior applications and the entire disclosures thereof are incorporated herein by reference.

FIELD

This invention relates to apparatus for supporting a pipe.

BACKGROUND

In the construction trade it often is necessary to provide convenient and effective supports for pipes. For example, in residential construction, lengths of pipe will be extended in runs that need support by adjacent joists, beams, columns, or walls.

Various types of supports have been devised in the past, but none have been fully satisfactory, in that they seldom have been adapted to operate conveniently with a variety of materials which would be on-site in such a project. As one example, when a plumber is installing pipe in a residential situation, often the pipe being installed is ABS or PVC pipe and there are sufficient quantities of such pipe available for use as supports for other pipes.

In the past, various hangers have been used where the worker has had to find a scrap piece of material, such as a length of board, to be nailed between joists to provide a horizontal support, or to nail in a position depending downwardly for a vertical support and then attach some form of connector thereto. In other instances, devices have been devised which are not only complex, but also are expensive and inconvenient to manufacture and use, due to the higher number of component parts.

Recent hangers have reduced the number of component parts. These hangers may involve a fixed strap at the end of an elongate structure, which structure is nailed in place. Although these hangers overcome some of the complexity issues present in previous hangers, these hangers are difficult to use and do not accommodate a variety of job-site conditions. These hangers use straps that are attached at their ends by adjacent latching mechanisms. This configuration makes adjustment difficult and limits their use. Difficulties arise in situations where the only available support is an overhead flat surface, such as a ceiling or wide joist or in other situations where there is little space between the adjustment and the support. In order to adjust the length of the strap, a worker must fit his hand into the tight space to adjust the strap. Thus, the configuration of these hangers can make them difficult to adjust or release. Additionally, these hangers are not well suited to utilizing other pipes as support, as is often practical or necessary in construction projects.

SUMMARY

One aspect of the disclosure is to provide apparatus for quickly, securely, and releasably mounting pipes allowing a maximum of mounting possibilities while utilizing a minimum number of part types.

A further aspect of the disclosure is to provide apparatus that is conveniently adjusted, even in tight spaces, while allowing for support of a wide variety of pipes.

Another aspect of the disclosure is to provide support apparatus for pipe which may be used in conjunction with sections of pipe available at the work site for connecting to a variety of support structures.

Yet another aspect of the disclosure is to provide apparatus for utilizing readily available and easily manufacturable parts.

Still another aspect of the disclosure is to provide apparatus for supporting a pipe which includes a base member coupled to an elongate flexible strap having opposed first and second ends with ratchet teeth formed along one side of the strap and being secured to the base member.

Another aspect of the disclosure is to provide a latching mechanism on the strap adjacent the first end through which the second end and a portion of the strap may move longitudinally along a path.

Yet another aspect is to provide a latching mechanism on the strap which is releasable.

A further aspect of the disclosure is to provide, in such an apparatus, a latching mechanism that includes a pawl adjacent one side of the path yieldably biased toward the path to engage ratchet teeth on the strap to permit movement of the strap in one direction along the path and to inhibit movement in a direction opposite the one direction and a bearing member at the opposite side of the path to support a side of the strap opposite said one side against movement away from the pawl when the pawl engages the strap to hold the strap in a selected position.

A still further aspect of the disclosure is to provide, in such apparatus, a strap secured to the base member in a region intermediate said first and second ends of the strap.

Another aspect of the disclosure is to provide, in such apparatus, a base member that has opposed side margins that diverge from each other as they progress away from the strap.

Still another aspect of the disclosure is to provide, in such apparatus a supplementary connector adapted to be secured to a stationary object, the supplementary connector having an opening formed therein having a cross-sectional configuration complementary to the configuration of the base member to receive and hold the base member therein.

A still further aspect of the disclosure is to provide in such novel apparatus a brace or stabilizer element to maintain selected orientation when supporting a pipe.

Yet another aspect is to provide a support member having variable configurations to adapt to selected pipe support needs.

DESCRIPTION OF THE DRAWINGS

FIG. 1 is a perspective view of apparatus according to an embodiment of the disclosure in operation supporting a section of pipe;

FIG. 2 is an enlarged cross-sectional view taken generally along the line 2—2 in FIG. 1;

FIG. 3 is an exploded perspective view of elements illustrated in FIGS. 1 and 2;

FIG. 4 is an exploded perspective view of another embodiment of the disclosure;

FIG. 5 is a top perspective view of an element of the apparatus illustrated in FIG. 4;

FIG. 6 is a perspective view of a third embodiment of the disclosure;

FIG. 7 is an exploded perspective view of a pipe support according to an application of the disclosure showing the pipe support in position around a supported pipe (shown dashed) in a first orientation relative to supporting structure;

FIG. 8 is an exploded perspective view similar to FIG. 7, except showing the pipe support in a second orientation relative to supporting structure;

FIG. 13 is an exploded perspective view of the pipe support of another alternative application;

FIG. 14 is a side elevation view showing a pipe supported by two pipe supports of different configurations that are attached to a supporting structure;

FIG. 15 is perspective view of yet another application.

FIG. 16 is a perspective view of another embodiment of a strap with a step-style stabilizer, or support, element thereon;

FIG. 17 is an enlarged view of a portion of the strap of FIG. 16

FIG. 20 is a perspective view of apparatus according to an embodiment of the invention in which a horizontally disposed section of pipe is used to support the strap arrangement;

FIG. 21 is a cross-sectional view taken along line 21—21 in FIG. 20;

FIG. 22 is a perspective view of the system showing a vertically disposed section of pipe used to support a pipe strap;

FIG. 23 is an enlarged side elevation view of the lower end portion of the system of FIG. 22 supporting a pipe; and FIG. 24 is a perspective view showing a pipe strap similar to that illustrated in FIG. 16 secured to a side of a vertical support.

DETAILED DESCRIPTION

Figure 9:
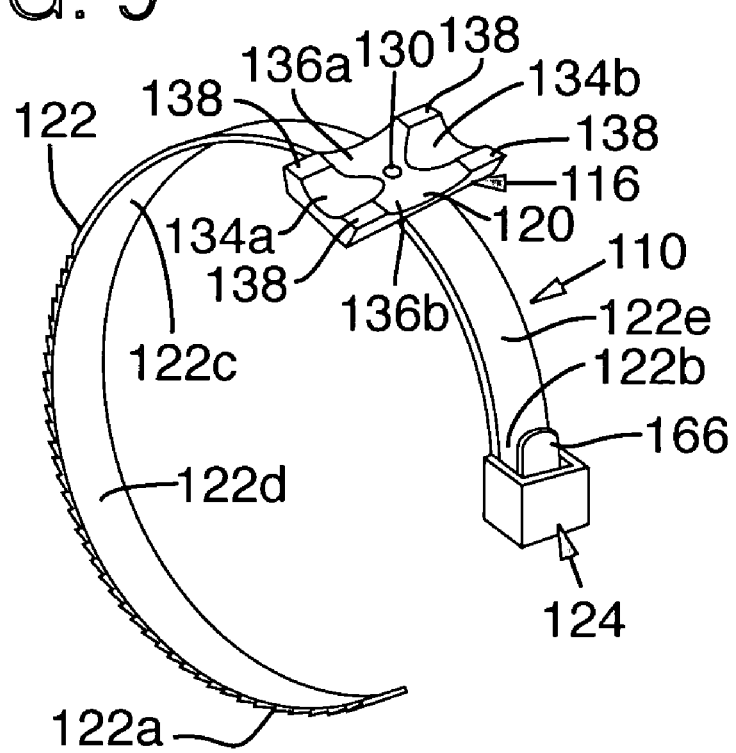
FIG. 9 is a perspective view of the pipe support of FIG. 7 where one end of the strap has been disengaged from a latching mechanism positioned at an opposite end of the strap.

Referring first FIG. 1, at 10 is indicated a section of a pipe, such as might be installed in an elongate run in a construction project. In this situation, it is illustrated suspended, or supported, adjacent a pair of laterally spaced floor joists 12, 14.

Pipe 10, as often used in residential and other construction, may be ABS or PVC plastic piping, and as such, quantities of such materials generally are readily available on the jobsite. In this instance, a second section of pipe 18, which may be such ABS or PVC plastic pipe, is shown cut to appropriate length to fit between joists 12, 14 and is secured thereto by nails or screws 20. Horizontally disposed pipe section 18, extending between joists 12, 14, thus provides a portion of a support system for pipe 10.

Apparatus for supporting pipe 10 on pipe section 18 is indicated generally at 24. This apparatus possibly is best illustrated in FIG. 3. The apparatus includes a central member 26 and a pair of holding clamps 28, 30. Member 26 and holding clamps 28, 30 may be made of ABS or PVC plastic, or any other materials which will provide the operational characteristics discussed below.

Referring first to central member 26, it includes a first gripping portion 32, having a pair of opposed, arcuate, flexible gripping arms 32a, 32b forming an arc of a circle greater than a semi-circle. An opening 32c is provided between the outer set of ends of the gripping arms. A plurality of holes 32d extend through arms 32a, 32b.

Referring still to FIG. 3, pipe 10 has a diameter indicated generally at 36. The central axis for pipe 10 is indicated generally at 38.

The inner diameter 40 of the arc formed by gripping arms 32a, 32b in the illustrated embodiment is no greater than diameter 36 of the pipe. Further, a central axis for the arc of the gripping arms is indicated generally at 42. The width of opening 32c is less than diameter 36 of pipe 10.

A second gripping portion 46 is secured, or coupled, to gripping portion 32 through a juncture section 48. This second gripping portion 46 includes a second pair of arcuate flexible gripping arms 46a, 46b, which are spaced from and are directed away from the first opening 32c. The outer ends of gripping arms 46a, 46b have an opening 46c therebetween which is spaced from and faces in a diametrically opposite direction from opening 32c. A plurality of holes 46d extend through arms 46a, 46b.

Referring still to FIG. 3, pipe section 18 has a diameter indicated generally at 52 and a central axis indicated generally at 54.

Arcuate flexible gripping arms 46a, 46b also are formed in an arc of a circle greater than a semi-circle having a diameter 56 which, in the illustrated embodiment, is no greater than diameter 52. A central axis for the arc of gripping arms 46a, 46b is indicated at 58. Opening 46c is smaller than diameter 52 of pipe section 18.

Completing the apparatus for supporting the pipes are a pair of holding clamps 28, 30, as previously noted. Clamp 28 is formed of flexible material in an arc of a circle greater than a semi-circle, with a diameter 60 and a central axis 62. Holding clamp 28 is formed to provide what may be considered a pair of opposed laterally spaced flexible holding arms 28a, 28b having an opening 28c between an outer set of their ends. Opening 28c is smaller than diameter 40 of gripping portion 32 and smaller than diameter 36 of pipe 10.

Referring still to FIG. 3, clamp 30 is formed of flexible material in an arc of a circle greater than a semi-circle, with a diameter 64 and a central axis 66. Holding clamp 30 is formed to provide what may be considered a pair of opposed, laterally spaced, flexible holding arms 30a, 30b having an opening 30c between an outer set of their ends. Opening 30c is smaller than diameter 56 of gripping portion 46 and smaller than diameter 52 of pipe 12.

Explaining operation of the apparatus thus described, a worker, having supplies of ABS, PVC, or other appropriate plastic pipe available, can easily attach a support, such as pipe section 18, to an appropriate section of the structure to which a pipe 10 is to be mounted. In the illustrated example, pipe section 18 is easily cut to appropriate length and secured between joists 12, 14 by nails or screws 20. After support pipe section 18 is in place, central member 26 is attached to pipe 18.

A quantity of appropriate adhesive capable of joining arms 46a, 46b to pipe section 18 is applied, as by brushing, to the inner surfaces of arms 46a, 46b. Upper gripping portion 46 then is pressed upwardly against the underside of pipe 18 such that pipe 18 enters through opening 46c between gripping portions, or arms, 46a, 46b. As the central member 26 is pressed upwardly, gripping arms, or portions, 46a, 46b flex outwardly to allow pipe 18 to enter the space therebetween. Once the pipe is fully within the space between gripping arms 46a, 46b, they spring back into position as illustrated in FIGS. 1 and 2, gripping the pipe and extending about a major portion of its circumference. As arms 46a, 46b grip pipe section 18 some of the adhesive seeps out through holes 46d to the outside of gripping portion 46.

After this occurs, holding clamp 30 is pressed down over the top of pipe 18 and about the outsides of gripping arms 46a, 46b. Opening 30c and the flexibility of arms 30a, 30b allow holding clamp 30 to be pressed over the outside of gripping portion 46 and bear thereagainst as illustrated in FIGS. 1 and 2. Arms 30a, 30b flex outwardly away form each other to allow pipe 18 and gripping arms 46a, 46b to be inserted and then spring back. When in position, the holding clamp 30 extends about a major portion of the circumference of pipe 18 and presses tightly against gripping portions, or arms, 46a, 46b to hold them tightly in place on pipe 18. Adhesive which has flowed out through holes 46d serves to adhere holding clamp 30 on gripping portion 46 and the pressing force applied by arms 30a, 30b press arms 46a, 46b tightly against pipe section 18 to assist in holding and adhering.

A quantity of appropriate adhesive then is applied to the inner sides of arms 32a, 32b, as by brushing. Pipe 10 then is pressed upwardly through the opening 32c in gripping portion 32, with gripping arms 32a, 32b flexing outwardly and away from each other to receive pipe 10 therebetween. The pipe then is received fully within gripping portion 32 as illustrated in FIGS. 1 and 2, with arms 32a, 32b extending about a major portion of the circumference of pipe 10. As arms 32a, 32b grip pipe 10 some of the adhesive flows out through holes 32d to the outside of arms 32a, 32b.

Finally, holding clamp 28 is pressed upwardly with pipe 10 and gripping portion 32 being received through opening 28c in holding clamp 28. Arms 28a, 28b flex outwardly and away from each other to allow pipe 10 and gripping portion 32 to be inserted and then spring back. Holding clamp 28 is pressed fully onto the outer portion of arms 32a, 32b as illustrated in FIGS. 1 and 2 to tightly squeeze, or press, arms 32a, 32b against the sides of pipe 10, with holding clamp 28 extending about a major portion of the circumference of pipe 10. Adhesive which has been flowed out through holes 32d serves to adhere holding clamp 28 on gripping portion 32 and the pressing force applied by arms 28a, 28b presses arms 32a, 32b tightly against pipe 10 to assist in holding and adhering.

As is seen, opening 28c in holding clamp 28 is positioned diametrically opposite opening 32c in gripping portion 32 and holding clamp 28 covers, or closes, opening 32c when in place. Similarly, opening 30c in holding clamp 30 is substantially diametrically opposed to opening 46c in gripping portion 46 and, when holding clamp 30 is in place it covers, or closes, opening 46c.

Although the assembly has been described herein with adhesive being applied between the gripping portions and their associated pipe sections, it should be recognized that the parts may be assembled without adhesive. With such non-adhesive assembly, the parts will still be held relatively securely in position by the combined action of the gripping arms and holding arms, but such may then be disassembled should such be desired.

A secure and easily installed support for a pipe thus is obtained.

When assembled, the gripping arms and holding arms extending about a pipe are directed in substantially diametrically opposite directions. Further, as best illustrated in FIG. 3, the central axes 42, 58 of gripping portions 32, 46, respectively, are disposed at a substantial angle relative to each other, and in this instance at 90 degrees to each other. Further, it will be seen that these axes 42, 58 occupy substantially parallel, spaced-apart planes. Although the axes of the gripping portions are shown as disposed at substantially 90 degrees to each other, it should be understood that they could be disposed at any angle relative to each other, including parallel.

Referring to FIG. 4, another embodiment is illustrated. Here, a joist 14 has a pipe section 70 secured thereto by a nail, or screw, 72, with pipe section 70 in a substantially vertical, depending orientation. Secured to the lower end of pipe section 20 is a support apparatus, indicated generally at 74.

Referring to FIGS. 4 and 5, support apparatus 74 has an upwardly directed cylindrical socket, or receiver, 76 with an internal diameter 78 corresponding to the outer diameter of pipe 70. Socket 76 receives the lower end of pipe section 70 and may be secured thereto by the application of an adhesive therebetween. Holes 79 through the side of socket 76 permit use of screws or other fasteners to provide added coupling between support apparatus 74 and pipe section 70 if desired.

Secured to and depending from socket 76 are a pair of opposed arcuate flexible gripping arms 80a, 80b. These are similar to arms 32a, 32b and have an opening 80c therebetween similar to opening 32c. Pipe 10 is illustrated in FIG. 4 ready to be inserted into the space between arms 80a, 80b through opening 80c. Arms 80a, 80b have holes 80d therethrough adapted to serve the same purpose as set out for holes 32d, 46d in the previously described embodiment.

A holding clamp 82, similar to holding clamp 28, previously described, is illustrated in position to be applied about gripping arms 80a, 80b and pipe 10 in the same manner as indicated for the installation in the embodiment illustrated in FIGS. 1–3.

Another hole 80e extends from the inner side of the gripping portion provided by arms 80a, 80b and into the center of socket, or receiver, 76. Hole 80e permits the support member bearing arms 80a, 80b to be secured to an adjacent support structure by extending a nail or screw therethrough and extending outwardly from the top of socket 76. For example, the upper rim of socket 76 could be placed flush against one side of a joist such as that indicated at 14 with arms 80a, 80b extending perpendicularly therefrom. A screw or nail then could be driven through hole 80e into the joist to hold the pipe support thereagainst. Similarly, it could be screwed or nailed to a horizontal surface.

A dashed outline 81 indicates a section at which a cut could be made to separate socket 76 from arms 80a, 80b. With socket 76 thus removed a nail or screw may be driven through hole 80e which remains to mount arms 80a, 80b more closely against a supporting surface such as a joist or floor. Further, the separated sockets 76 when separated from arms 80a, 80b along cut line 81 may be inverted from the position illustrated in FIG. 5 and a nail or screw driven upwardly therethrough into a horizontally disposed overlying support surface. In this orientation the socket faces downwardly to receive the upper end of a pipe, such as pipe 70, which may be secured therein by adhesive or screws extending through holes 79.

A third application of the invention is illustrated in FIG. 6. Here, a support pipe section 84 is indicated in dashed outline and a pipe similar to pipe 10, but positioned to be supported above support pipe section 84, is indicated also in dashed outline.

Here, support apparatus 88 includes a primary portion 90, substantially similar that previously described for central member 26. Here the opposed gripping arms have spaced-apart holes 92, 94 extending therethrough, through which a fastener, such as screw 96, may extend. A holding clamp 100, similar to holding clamp 30, is included also.

As illustrated in FIG. 6 it may be necessary in some installations to place a support pipe section 84 closely adjacent a floor, and thus a holding clamp cannot conveniently be placed over the gripping arms of the lower portion thereof. In such instance, the support pipe section 84, which does not carry fluids therethrough, may be secured in place and the lower gripping arms of member 90 pressed downwardly thereover. When properly positioned, a screw 96 is directed through one of holes 94 and screwed into pipe section 84 to hold the apparatus in position. It then is a simple matter to mount pipe 10 in the upper portion with overlying holding clamp 100 to complete the assembly as previously described.

Referring to FIGS. 7–15 further embodiments are disclosed.

As is described below, a worker is able to attach the apparatus, referred to herein as a pipe support, to a variety of supporting structures by itself or with associated mating members for the purpose of supporting a pipe or other object. The associated mating members include one or more supplementary connectors and lengths of pipe used to extend the length of the pipe support. Examples of supporting structures include a support pipe running parallel to a pipe to be supported as illustrated in FIG. 7, a support pipe running transversely to a pipe to be supported as illustrated in FIG. 8, and a flat overhead support as shown in FIGS. 10, 13–15, and to the side of a joist as in FIG. 11.

In one application of the disclosure as shown in FIG. 7, the pipe support 110 may be attached to a supporting structure having a convex outer surface, e.g., a pipe 112, such that the supported pipe 114 (shown in dashed lines) is approximately parallel to the pipe 112. As is seen pipe 112 is cut to length to fit between a pair of joists 113a, 113b and is secured thereto adjacent its opposite ends by screws or nails 128.

The pipe support 110 includes a flexible strap 122 with ends that can be overlapped to form a closed ring 125 and a base member 116 to which the strap 122 is coupled for attaching the pipe support 110 to supporting structure. The components may be made of plastic or other appropriate materials. The base member 116 may be coupled to the strap in the molding process or by appropriate adhesive or plastic welding. A hole 130 extending through the strap 122 and base member 116 is adapted to receive a fastener, such as screw 128, therethrough. The screw 128 may serve to attach the pipe support to supporting structure as shown in FIG. 7. In some applications, nails or other fasteners may be used instead of screws.

Referring to FIG. 9, strap 122 is formed of a flexible material, such as a plastic, and has a first end 122a, a second end 122b and a body 122c between the ends 122a, 122b. In the illustrated strap 122, a latching mechanism 124 is formed, or secured, at the second end 122b. It also will be noted that strap 122 has an inner surface, or face 122d and an opposite outer surface, or face 122e. The base member 116 and latch mechanism 124 extend, or project, outwardly from the outer surface 122e. As shown in FIG. 7, the inner surface 122d is directed inwardly toward a pipe 114 to be supported thereby. The first end 122a can be passed through the latching mechanism 124 and engaged at a selected location, with the first end 122a overlapping the second end 122b, thereby forming the closed ring 125 that secures the pipe 114. Further details regarding the construction of the strap 122 and the latch mechanism 124 are described below.

The base member 116 may be formed of a semi-rigid material such as ABS, PVC or other similar plastic, and has a surface 118 that faces the strap 122 and an opposing surface 120 (see FIG. 9). The base member 116 has opposed sides 142a, 142b which diverge in a dove-tail configuration on progressing outwardly from strap 122. Hole 130 is adapted to receive the screw 128 (or other fastener), which is then inserted into a hole 132 in the supporting pipe 112 to attach the pipe support 110.

As shown in FIG. 7, the supporting pipe 112 extends in a direction approximately perpendicular to the closed ring 125. As can be seen in FIG. 8, the pipe support 110 is also capable of supporting the pipe 114 when positioned transversely to a convex support such as the pipe 112.

In FIG. 8, the closed ring 125 of the pipe support 110 is approximately parallel to the support pipe 112 as shown. Of course, the pipe support 110 can be configured such that the pipe 114 is held relative to a convex supporting surface at angles other than about 0° (FIG. 7) and about 90° (FIG. 8).

Figure 10:
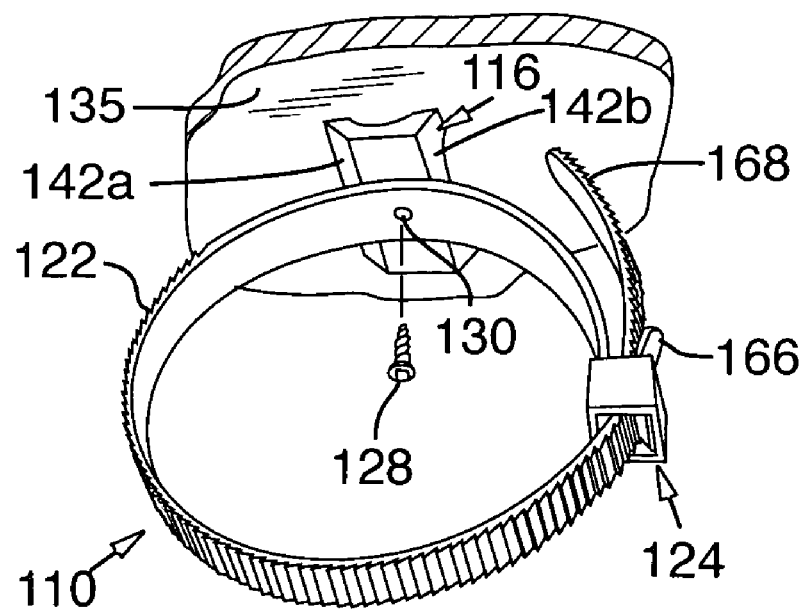
FIG. 10 is a perspective view of the pipe support of FIG. 7 showing the pipe support in a third orientation relative to a supporting structure.

As shown in FIG. 10, the pipe support 110 may be also be mounted to a substantially flat surface 135 by use of a screw 128.

As best illustrated in FIG. 9, the base member 116 is formed with features to facilitate mounting. The base member 116 has four concave sections 134a, 134b, 136a, 136b. Concave sections 134a, 134b are aligned along the length of the base member 116 while concave sections 136a, 136b are aligned transversely relative to concave sections 134a, 134b. Explaining further the axis of the concave configurations of sections 136a, 136b, substantially parallel a plane occupied by strap 122, while the axis of sections 134a, 134b extends substantially normal, or perpendicular, to the plane occupied by the strap 122. These concave sections 134a, 134b, 136a, 136b facilitate mounting the pipe support 110 to a supporting structure with a convex outer surface, such as the pipe 112, also referred to as a supplementary support, as seen in FIGS. 7 and 8. The flat portions 138 on surface 120 of the base member 114 allow the pipe support 110 to be mounted directly to other structures, such as a flat overhead support (see FIGS. 10 and 14, right side). Thus, the base member 16 provides for at least three different mounting configurations: mounting to a pipe running approximately parallel, mounting to a pipe running transversely, and mounting to a flat surface.

Figure 11:
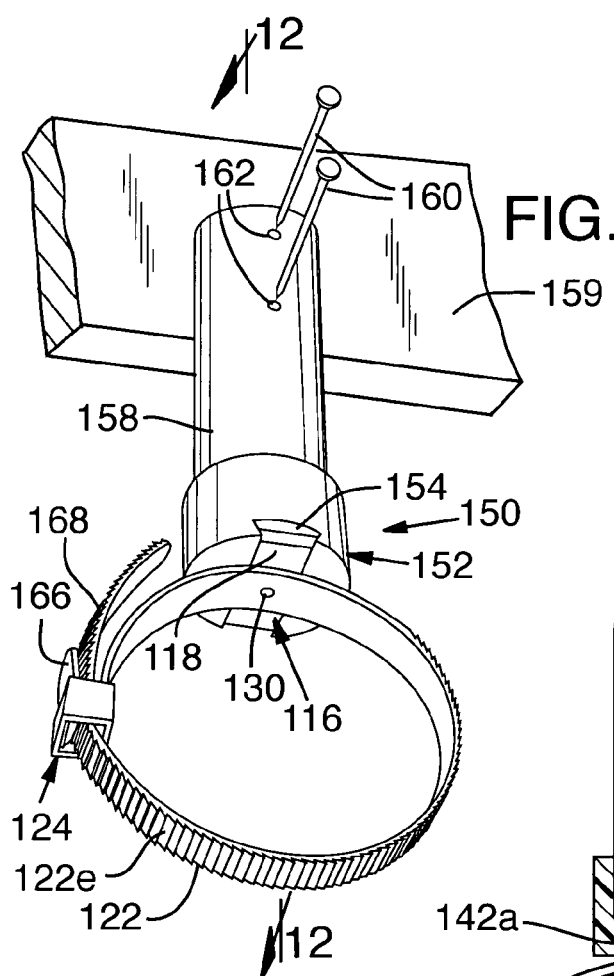
FIG. 11 is a perspective view of the pipe support of FIG. 7 according to an alternative application.
Figure 12:
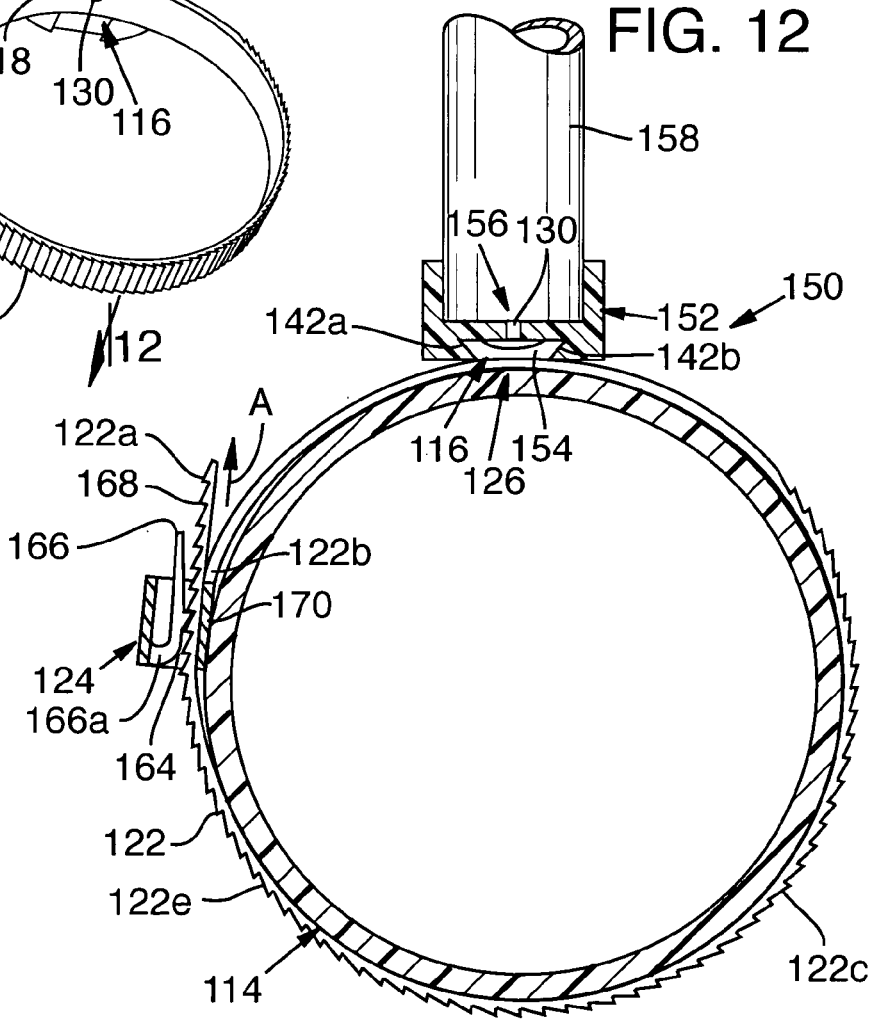
FIG. 12 is an enlarged cross-sectional view of a lower portion of the apparatus of FIG. 11 taken along the line 12—12 FIG. 11.

Other applications of the disclosure make use of a supplementary connector 152. As illustrated in FIGS. 11 and 12, a pipe support assembly 150 includes the base member 116 that is adapted to be coupled to a supplementary connector 152. The supplementary connector 152 is made of a similarly rigid material as the base member. The supplementary connector 152 is further adapted to be connected to a support, e.g., a piece of pipe 158, such as ABS, PVC, or other appropriate plastic pipe. Other examples of supports include flat overhead supports. In the illustrated application, base member 116 includes surface 118 nearest the strap 122, and diverging sides 142a, 142b, such that base member 116 forms a tenon.

The assembly 150 is secured to a vertical support structure (such as the vertical side of a joist 159) by, e.g., two nails 160 extending through respective holes 162 in the piece of pipe 158. Depending pipe 158 may be of any selected length to permit proper placement of a pipe to be supported in strap 122.

Referring to FIG. 12, the base member 116 is shaped to be received in an opening 154 of the supplementary connector 152. In the illustrated application, the opening is a dove-tail shaped mortise 154 complementary to the shape of base member 116. The base member 116 has diverging sides 142a, 142b resulting in a tenon-like cross-section for engagement within the mortise 154. Other correspondingly-shaped configurations are possible. Opening 154 extends transversely of connector 152 allowing base member 116 to be slid therein, as illustrated in FIG. 15.

The supplementary connector 152 has a cavity 156 defined therein opposite opening 154, and the cavity 156 is adapted to receive support 158. In the illustrated application, the cavity 156 is cylindrical and the support is a length of PVC or ABS pipe 158. The piece of pipe 158 may be secured to the supplementary connector 152 by a threaded connection, screws or other fasteners, adhesive, or friction. Such pipe often is available at job sites and may easily be cut to a desired length.

FIG. 12 also shows details of the latching mechanism 124. As illustrated, the latching mechanism 124 includes first opening 164. Strap 122 has ratchet teeth 168 formed along at least a portion of its outside surface 122e. A portion of strap 122 may move longitudinally along a direction A through latching mechanism 124. The strap 122 is attached at an intermediate point 126 along its length to the base member 116, and the latching mechanism 124 is positioned remote from the base member 116 to allow access during installation. Latching mechanism 124 includes a pawl 166 yieldably biased to engage ratchet teeth 166 on strap 122 to permit movement of the strap in the direction A and to inhibit movement in an opposite direction. The pawl has a resilient connecting portion 166a which urges the pawl to the right as seen in FIG. 12. Latching mechanism 124 also includes bearing member 170 located opposite pawl 166 to support strap 122 from moving away from pawl 166. Thus the bearing member 170 works in combination with pawl 166 to engage the strap 122 and hold it in a selected position. Latching mechanism 124 may be configured to allow the worker to disengage the pawl 166 (i.e. pull pawl 166 to the left in FIG. 12) and push the strap 122 in the opposite direction, e.g., to release the strap from the pawl to disassemble an installation.

In yet another application illustrated in FIG. 13, the pipe support assembly 150 provides for the use of readily available and easily sizeable pipe by using multiple supplementary connectors 152, 152a. The pipe support is attached to a supplementary connector 152 and to the piece of pipe 158 as described above, and the opposite end of the pipe 158 is attached to another supplementary connector 152a. The supplementary connector 152a is attached with the screw 128 through a hole 160 to an overhead support 161 prior to attaching pipe 58 thereto. The connections between the supplementary connectors 152, 152a and the pipe 158 may be made in the same manner as described above.

Advantageously, the modularity of the pipe support and the associated mating members allow different configurations to be used at different locations in the same installation. For example, as seen in FIG. 14, the pipe 114 is supported by two pipe supports 110, 150. Pipe support 110 is the same as shown in FIG. 10, wherein the pipe 114 is supported by the strap 122 attached to the base member 116 and secured by the latching mechanism 124. Base member 116 is directly secured to a first overhead support 170. Apparatus 150 is shown in a perspective view in FIG. 15. The pipe 114 is supported by the strap 122 attached to the base member 116 and secured by the latching mechanism 124 and further supported by the supplementary connector 152. Supplementary connector 152 is secured directly to a second overhead support 172 that is at a different elevation than the first overhead support 170. Thus, the supplementary connector 152 may be used by itself as an adapter, or spacer.

Referring to FIGS. 16–24, further embodiments are disclosed. The system illustrated in FIGS. 16–24 includes component parts very similar to those previously described in regard to the embodiments in FIGS. 7–15. However, in the FIG. 16-24 embodiments, certain revisions have been made to the component parts to improve operability of the system.

The pipe support components in the FIG. 16-24 disclosure include a flexible strap 122' with ends that can be overlapped to form a closed ring and a base member 116' to which the strap 122' is coupled for attaching the pipe support to supporting structure. Three holes, 130a, 130b, 130c, are formed through base member 116' and are adapted to receive fasteners, such as a nail or screw 128, to secure the system to an adjacent support.

As described for previous embodiments, strap 122' is formed of a flexible material, such as plastic, and has opposed first and second ends with an elongate body extending there between. A latching mechanism 124' is formed, or secured at the one end of strap 122'.

The latching mechanism 124' is similar to that previously described in regard to the FIGS. 7–15 embodiments, having a pawl 166' which is yieldably biased to engage ratchet teeth on strap 122' to permit movement of the strap in one direction and inhibit movement in an opposite direction. A resilient connection for pawl 166' urges the pawl into engagement with ratchet teeth on strap 122' to hold it in a selected position when wrapped around a pipe. Latching mechanism 124' also is configured with an outer end of pawl 166' extending outwardly to allow a worker to pull the pawl 166' to the right as seen in FIG. 23, to disengage the pawl so that strap 122' may be released to disassemble the installation.

A substantially rigid step-like stabilizer, or brace, member or element 200 is secured to and projects outwardly from strap 122' in the same direction as do base member 116' and latching mechanism 124'. Stabilizer element 200 has a first, or lower, support portion having a first bearing surface 200a and a second, or higher, support portion having a second bearing surface 200b. The stabilizer element is secured to strap 122' for support purposes as will be described below.

Referring to FIG. 17, which includes an enlarged illustration of base member 116', it will be seen that base member 116' has on its uppermost, or outermost, surfaces a number of small projections 202. The purpose for projections 202 will be discussed below.

Figure 18:
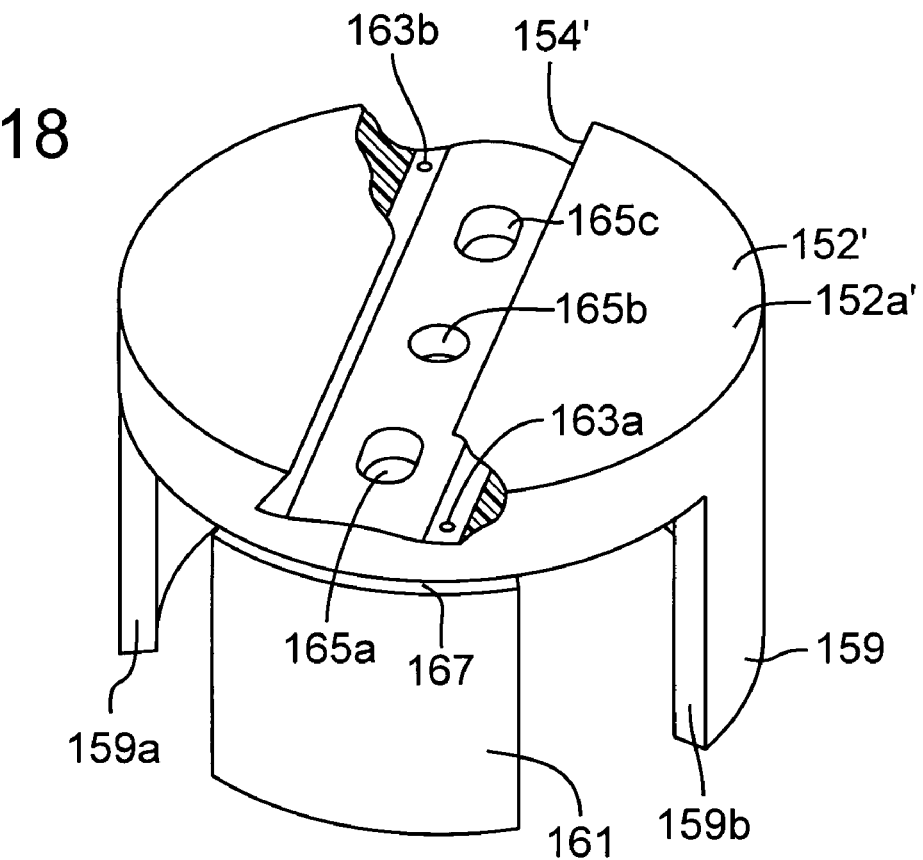
FIG. 18 is a perspective view of one end of another embodiment of a supplementary support member with portions broken away.
Figure 19:
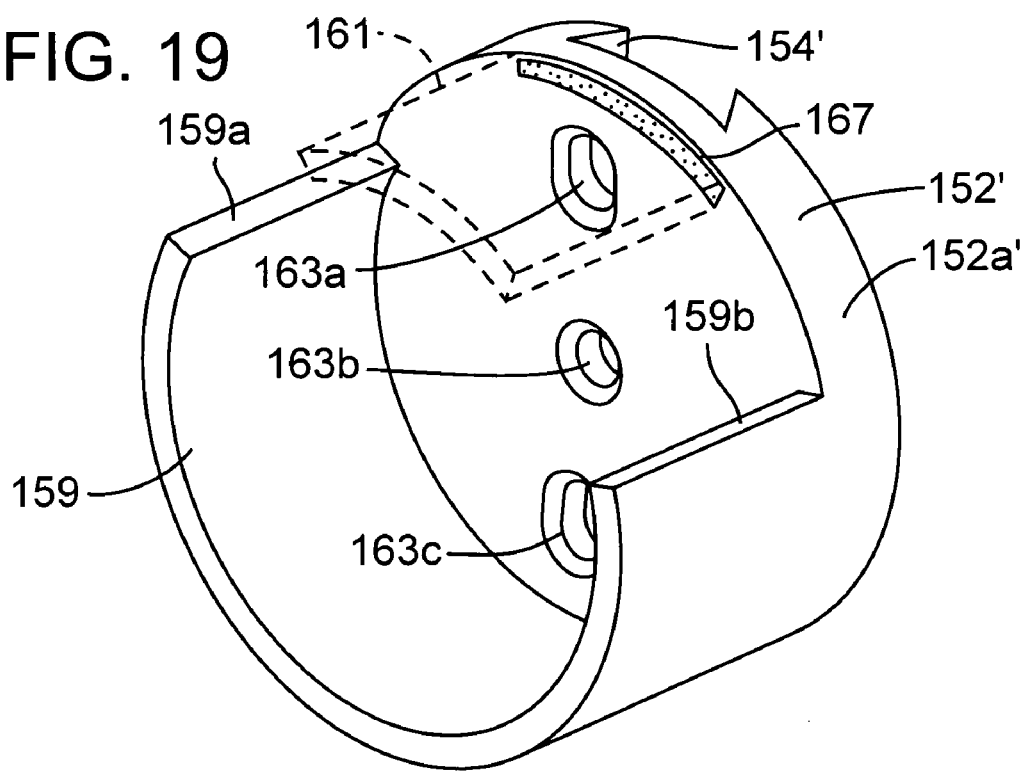
FIG. 19 is an opposite side perspective view of the supplementary support member shown in FIG. 18 with a projecting element broken away and shown in dashed line.

Referring to FIGS. 18 and 19, a supplementary connector 152' is illustrated which is somewhat similar to supplementary connectors 152 previously described, and may serve the same function in an assembled apparatus. Connector 152' has a disc-shaped base 152a'. At its base, the supplementary connector 152' has a dovetail shaped mortis 154' complementary to the shape of base member 116' to slidingly receive base member 116' therein. Supplementary connector 152' also has holes 165a, 165b, 165c formed therethrough which align with holes 130a, 130b, 130c in base member 116' when the base member is properly positioned in the base of supplementary connector 152'.

In the broken away portions of the bottom of supplementary connector 152', as seen in FIG. 18, small depressions, or detents, 163a, 163b are positioned in the dovetail shaped mortis region 154' and are positioned to receive projections 202 to releasably hold base member 116' in selected position in dovetail mortis 154' when the parts are assembled. The projections 202 and detents 163a, 163b act as interengaging positioning elements to yieldably hold the base member in selected position.

Projecting axially from the disc-shaped base portion 152a' of supplementary connector 152' are arcuate walls 159, 161 respectively. As is seen, wall 159 extends in an arc of at least a semi-circle, and in the illustrated embodiment is somewhat greater than a semi-circle having opposed ends 159a, 159b. Wall section 161 is smaller than a half circle and rests between, and is spaced from, ends 159a, 159b. When walls 159, 161 are in place as illustrated in solid outline in FIG. 18, they function in much the same manner as the full cylindrical walls of previously described supplementary connectors 152.

However, an improvement here is that wall portion 161 may be removed, as by being broken off, as illustrated by the removed position illustrated by the dashed outline in FIG. 19. The intersection between base portion 152a' and the lower end of wall section 161 may be scored to accommodate removal of wall section 161. In FIG. 19 the region from which wall section 161 has been removed is indicated by stippled region 167. Upon removal of wall section 161, a support pipe may be slipped laterally into the space bounded by wall section 159 to be held as illustrated in FIGS. 20 and 21 as will be described below. Ends 159a, 159b are sufficiently widely spaced apart to allow pressing of a support pipe laterally therein.

The pipe support provided by the members illustrated in FIGS. 16–19 may be used in pipe support combinations and situations as described previously in regard to the embodiments illustrated in FIGS. 7–15. However, the revisions to this pipe support provide additional improvements in operability as will be described below and particularly in relation to FIGS. 20–24.

First, it should be recognized that the interengaging projections 202 on the base member 116' and detents 163a, 163b in the mortis section 154' of supplementary connector 152' permit the base member 116' to be slid into the mortis section 154' and be releasably held in selected position, with projections 202 releasably entering detents 163a, 163b. When so positioned, holes 130a, 130b, 130c in the base member 116' properly align with holes 165a, 165b, 165c in supplementary connector 152' to receive elongate fasteners therethrough.

When the strap 122' is wrapped around a pipe 114' as illustrated in FIG. 23, and secured thereabout, with latching mechanism 124' and its associated pawl 166' engaging ratchet teeth on the strap 122', pipe 114' will be held therein. However, should it be desirable to release the strap from the pipe, it is a simple matter for a user to engage the outwardly projecting end of pawl 166, as shown in FIG. 12, and 166' as shown in FIG. 23 and draw the pawl away from strap 122' to allow the strap to be released and the pipe to be removed therefrom.

Referring to FIG. 20, a pair of supplementary connectors 152' are shown secured to spaced apart vertically disposed members, such as studs or joists 208, 210. This connection would be via fasteners, such as screws or nails driven through holes 165a, 165b and/or 165c. Further, it will be seen that in both of supplementary connectors 152' its wall section 161 has been removed and the opening between ends 159a, 159b directed upwardly. This permits opposite end portions of an elongate section of support pipe 112' to be dropped, or inserted laterally, into opposed supplementary connectors 152', with opposite end portions of support pipe 112' thus supported by wall sections 159. As previously described, the spacing between ends 159a, 159b is such as to allow entry of the end portions of support pipe 112'.

As best seen in FIG. 21, wall section 159 extends in an arc somewhat greater than a half circle so that its ends 159a, 159b are a bit more closely spaced than the inner diameter of wall section 159. The inner diameter of wall 159 is substantially equal to the outer diameter of pipe 112'. Support pipe 112' has an outer diameter slightly greater than the spacing between ends 159a, 159b allowing the end portion of support pipe 112' to be snap-fit into the supplementary connector and releasably held therein. The arc of wall 159 may be in a range of 185 to 210 degrees to provide the reduced width opening between ends 159a, 159b.

Further, still referring to FIG. 20, and as shown in FIG. 8, a screw or other fastener 128 may be inserted through hole 130b in base member 116' and screwed into support pipe 112' to hold the assembly thereon.

An advantage of the present embodiment is that when the pipe support is thus secured to support pipe 112', stabilizer element 200 may bear against the underside of support pipe 112' to stabilize the somewhat flexible strap support 122'.

Referring to FIG. 22, the assembly shown here is somewhat similar to that previously illustrated and described in regard to FIG. 13. A first supplementary connector 152A' is secured by a fastener 128 to an overlying structure 212. An elongate section of readily available plastic pipe 158' is secured within supplementary connector 152A', as by gluing, and another supplementary connector 152' is secured, as by gluing, to the lower end of pipe section 158'. As is seen in FIG. 22, wall sections 159, 161 of supplementary connectors 150A' and 152' remain intact in this assembly.

The base member 116' attached to strap 122' is slid into the mortis opening of supplementary connector 152'. When strap 122' is wrapped into a circle to support a pipe 114' (see FIG. 23), and extended through latching mechanism 124', stabilizer element 200 is properly positioned to engage the underside of supplementary connector 152' as shown in FIGS. 22, 23. Here, the lower step support portion 200a is illustrated engaging the underside of supplementary connector 152' to stabilize the strap and hold it in proper position when supporting pipe 114'.

Referring to FIG. 24, an application is illustrated for supporting such apparatus directly on a vertical support post 214. Here, base member 116' is placed against a vertical surface of post 214 and a fastener, such as screw 128, is extended through one or all of holes 130a, 130b, 130c to secure the assembly thereto. The apparatus is positioned with stabilizer element 200 below base member 116, such that it can engage the vertical side of post 214 and support the strap in the position illustrated to inhibit sagging of the support when a pipe is held therein.

The step-style design of the stabilizer member adapts it for use in a variety of assemblies. For example, as shown in FIGS. 22, 23 in one assembly the lower support portion, or bearing surface, 200a bears against the supplementary connector to stabilize the assembly. In FIGS. 20, 24 the upper support portion, or bearing surface 200b, engages adjacent structure to provide stabilization.

In yet other applications (not shown) the system, or apparatus, may be used in a variety of combination with lengths of pipes and other components disclosed as necessary to meet the needs of the situation.

From the embodiments described above, it should be apparent to a person of ordinary skill in the art that modifications will fall within the spirit and scope of the following claims. Accordingly, the scope of the following claims should not be limited by the preceding disclosure.

I claim:

1. Apparatus for supporting a pipe comprising,
a base member, having a selected cross-sectional configuration,
an elongate flexible strap secured to said base member, said strap having ratchet teeth formed along one side thereof,
a latching mechanism through which a portion of said strap may move longitudinally along a path, said latching mechanism comprising a pawl adjacent one side of said path yieldably biased toward said path to engage said ratchet teeth on said strap to permit movement of said strap in one direction along said path and to inhibit movement in a second direction opposite said one direction and a bearing member at the opposite side of said path to support a side of said strap opposite said one side against movement away from said pawl when said pawl engages the strap to hold the strap in a selected position, and
a supplementary connector adapted to be secured to a support structure, said supplementary connector having an opening formed therein having a cross-sectional configuration complementary to the configuration of said base member to receive and hold said base member, said base member and supplementary connector having interengaging positioning elements thereon to yieldably hold said base member and supplementary connector in selected positions relative to each other;
wherein said positioning elements comprise a projection on one of said base member or supplementary connector and a detent for releasably receiving said projection on the other of said base member or supplementary connector, and
wherein said base member has a hole extending therethrough, said supplementary connector has a hole extending therethrough, and said holes are aligned when said base member and supplementary connector are held in said selected positions.

2. The apparatus of claim 1, wherein said base member has opposed side margins which diverge from each other on progressing away from said strap, said opening comprises a slot which extends transversely of a portion of said supplementary connector, the portion of said base member comprising said diverging side portions is slidably received in said slot, and said projection and detent are disposed in a region where said base member and supplementary connector slidably meet.

3. The apparatus of claim 2, wherein said diverging side portions of the base member and said slot have complementary dove-tail shaped configurations.

4. Apparatus for supporting a pipe comprising,
an elongate flexible strap adapted to be wrapped about a pipe, said strap having an inner surface to be directed inwardly toward a pipe held therein and an opposed outer surface,
latching mechanism operable to secure said strap about a pipe,
a base member secured to and projecting outwardly from said outer surface of said strap,
an elongate support member,
a first supplementary connector having a support member opening formed therein and dimensioned to receive an end of said elongated support member, and a second supplementary connector having a base member opening formed therein and dimensioned to receive and hold the base member, and a support member opening formed therein and dimensioned to receive an end of said elongated support member, wherein said elongated support member has a selected cross sectional configuration at an end thereof, and wherein said support member opening in the second connector comprises a first wall section extending axially outwardly from a base portion, and a second wall section extending axially outwardly from said base portion, and said first and second wall sections bound said cavity to receive said elongated support member in an axial direction.

5. The apparatus of claim 4, wherein said supplementary connector is adhesively secured to said support member.

6. The apparatus of claim 4, wherein said base member has an opening extending therethrough for receiving a fastener to secure said apparatus to a stationary object.

7. The apparatus of claim 4, wherein at least one of said first and second supplementary connectors has an opening extending therethrough for receiving a fastener to secure said apparatus to a stationary object.

8. The apparatus of claim 4, wherein said second wall is removable from said base portion to provide an opening through which said support member may be inserted laterally into said cavity.

9. The apparatus of claim 4, wherein said support member is cylindrical and said cavity is substantially cylindrical.

10. The apparatus of claim 9, wherein said second wall section is removable from said base portion and said first wall section defines a semi-circular boundary for said cavity permitting said support member to be inserted laterally into said cavity.

11. The apparatus of claim 10, wherein said second wall section is removable from said base portion and said first wall section defines an arcuate boundary for said cavity which is slightly greater than a semi-circle permitting said support member to be inserted laterally into said cavity and releasably held therein.

12. The apparatus of claim 11, wherein said first wall section extends in an arc in a range from 185 to 210 degrees.

* * * * *